Sept. 27, 1955      F. V. JOHNSON      2,718,788
GYROSCOPIC SYSTEM
Filed April 18, 1950
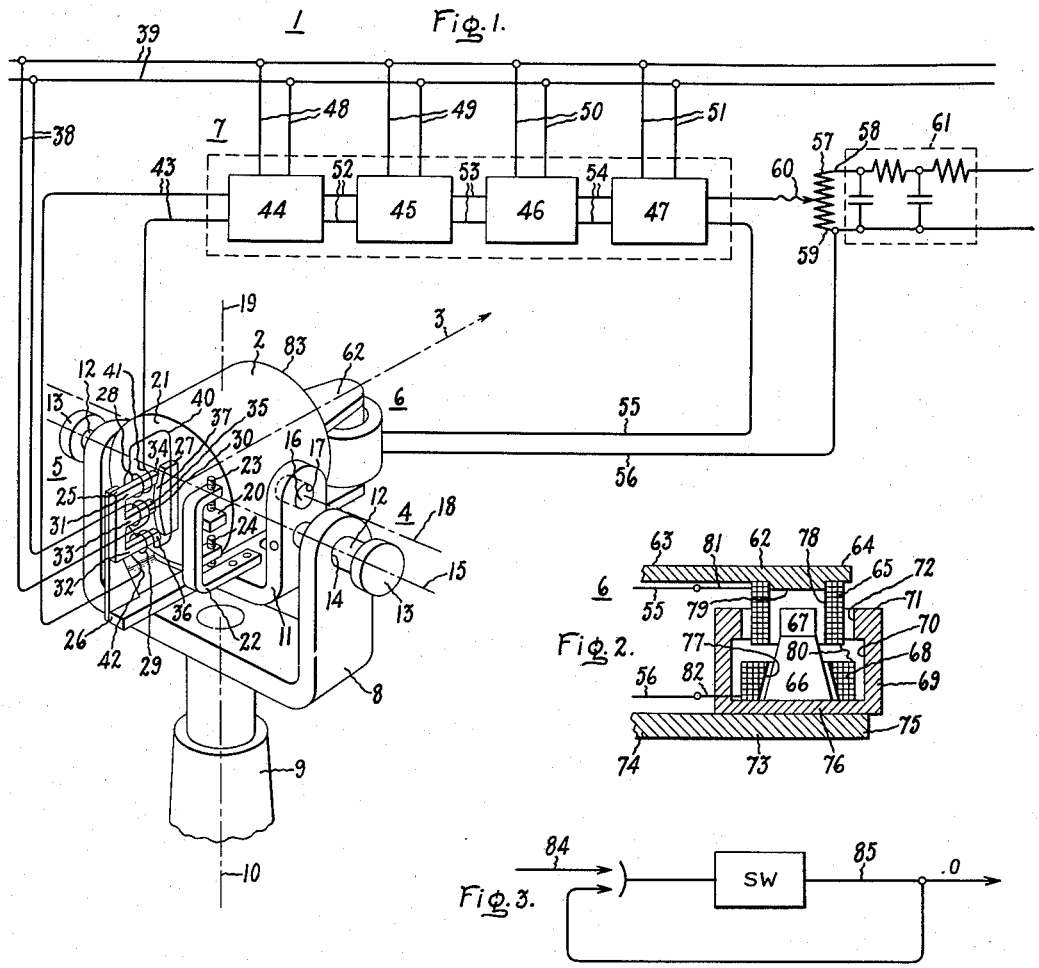
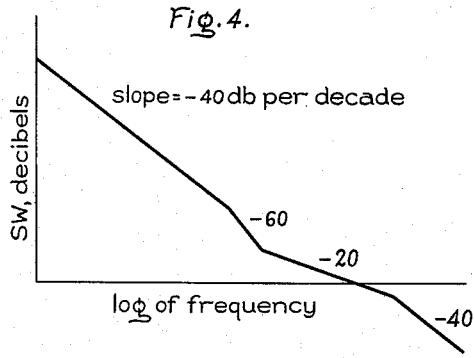
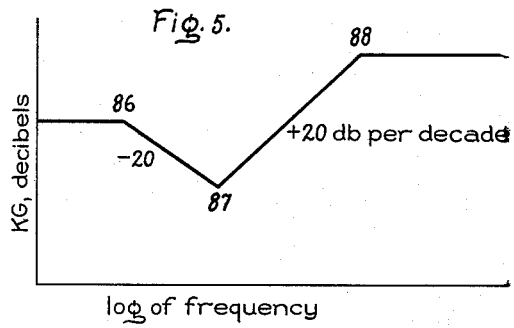
Inventor:
Frithiof V. Johnson
by Claude A. Mott
His Attorney.

United States Patent Office 2,718,788
Patented Sept. 27, 1955

2,718,788

GYROSCOPIC SYSTEM

Frithiof V. Johnson, Scotia, N. Y., assignor to General Electric Company, a corporation of New York Application April 18, 1950, Serial No. 156,694

7 Claims. (Cl. 74—5.5)

This invention relates to gyroscopic systems and, more particularly, to a gyroscopic system for measuring one component of angular velocity of a tracking device such as a radar antenna or an optical sighting station about a given axis and for supplying an output electric signal directly proportional thereto.

In one conventional gyroscopic system for accomplishing the above results, a gyroscope is pivoted about a supporting axis perpendicular to the spin axis of the gyroscope and rotatable about an axis perpendicular to the supporting axis and the spin axis of the gyroscope. A pick-off device and a spring biasing means are connected to the supporting axis to cooperate in supplying a voltage or current signal through an amplifier, range resistor and filter circuit to a computer device. In addition, mechanical damping devices are used to obtain satisfactory dynamic response. The accuracy of such a system depends upon maintaining a relative zeroing between the pick-off device and biasing spring, a constant ratio of input angle to output voltage in the pick-off, a constant ratio of output current or voltage to input voltage in the amplifier, and on the magnitude of the voltage supplied to the pick-off device or amplifier. Maintaining desired relative characteristics of the above recited elements and providing damping without static friction presents a difficult problem in gyroscopic systems applications.

Therefore, it is an object of my invention to provide a gyroscopic system wherein the accuracy thereof does not depend on the linearity of the pick-off device or of the amplifier, on the zeroing of the pick-off device, or on the magnitude of voltage supplied to the pick-off device or amplifier.

A further object is to provide a gyroscopic system which is simple in structure and reliable in operation.

In general, my invention consists of a gyroscopic system comprising a gyroscope, a pivot support means for the gyroscope, a pick-off device, an electric torque motor, and a precession amplifier arranged to produce an electric signal proportional to the angular velocity of the gyroscope as it is turned on its pivot support about a given axis.

For a complete understanding of my invention, reference should be had to the following specification and the accompanying drawing in which Fig. 1 is a diagrammatical view of a gyroscopic system illustrative of my invention; Fig. 2 is a cross-sectional view of a torque motor used in my invention; and Figs. 3, 4 and 5 are a circuit diagram and charts used to explain the theory of my invention.

Referring to the drawing, in Fig. 1 thereof, there is shown a gyroscopic system 1 illustrative of my invention and comprising a gyroscope 2 having a spin axis 3, a support means 4, a pick-off device 5, a torque motor 6, and a precession amplifier 7.

The support 4 may be any suitable device arranged to provide oscillation of the gyroscope 2 about an axis perpendicular to the spin axis 3, and rotation of the gyroscope 2 about an axis perpendicular to the first-mentioned axis and the axis of spin of the gyroscope. For example, support means 4 may comprise, as shown in Fig. 1, a fork-shaped training yoke 8 pivotally journalled in a support member 9 for pivotal rotation about an axis indicated by the dotted line 10, a sighting yoke 11 fixed as by welding or other suitable means to a pair of axis members 12 provided with knob shaped handles 13 and journalled in aligned apertures 14 in the training yoke 8 to provide pivotal support of the sighting yoke 11 about an axis perpendicular to the spin axis 3 and indicated by the dotted line 15, and a pair of axis members 16 fixed as by welding or other suitable means one on each side of the gyroscope 2 and journalled in aligned apertures 17 formed in the sighting yoke 11 to provide limited oscillation of the gyroscope 2 about an axis perpendicular to the spin axis 3 and indicated by the dotted line 18.

A consideration of Fig. 1 of the drawing and the above description will indicate that support 4 provides for oscillation of the gyroscope 2 about axis 18 which is perpendicular to the spin axis 3 and for rotation about an axis 19 mutually perpendicular to the spin axis 3 and the axis 18. The angular velocity of the sighting yoke 11 about axis 19 is the quantity measured by the gyroscope system.

To limit the oscillation of the gyroscope 2 about the axis 18 and with respect to the sighting yoke 11, any suitable stop means may be used. For example, an adjustable stop means as shown in Fig. 1 and comprising a stop 20 fixed as by welding or other suitable means to an end 21 of the gyroscope 2 and an E-shaped member 22 supplied with a pair of adjusting screws 23 and 24 may be employed. The adjusting screws 23 and 24 are preferably adjusted to provide about 1 degree of oscillation of the gyroscope 2 about the axis 18 with respect to the sighting yoke 11.

Rotation of the gyroscope 2 and the sighting yoke 11 in unison about the axis 15 is accomplished by manually twisting the knob handles 13 clockwise or counterclockwise depending upon the desired direction of rotation. Rotation of the gyroscope 2 about the axis 19 is accomplished by swinging the training yoke 8 about the axis 10 by means of the handles 13.

The pick-off device 5, shown in Fig. 1, comprises an E-shaped core member 25, an L-shaped support member 26, an armature 27, a pair of output coils 28 and 29 and an exciting coil 30. The core member 25 comprises two outer legs 31 and 32 and a shorter middle leg 33 forming at their free ends 34—36 an arc substantially conforming to an arcuate surface 37 of the armature 27. The armature 27 is positioned on the end 21 of the gyroscope 2 with its arcuate surface 37 projecting outwardly therefrom to pass along the projecting ends 34—36 of the legs 31—33 of the core member 25 when the gyroscope 2 oscillates about the axis 18. The core member 25 is supported in position fixed with respect to the sighting yoke 11 by the L-shaped support member 26 which is fixed as by welding or other suitable means to the sighting yoke 11 and the E-shaped core 25.

The exciting coil is positioned on the middle leg 33 of the core member 25 and electrically connected through a pair of conductors 38 to a source of alternating current indicated by a pair of conductors 39 to produce a flux passing from the middle leg 33 of the core 25 through the armature 27 to the outer legs 31 and 32 thereof on one cycle and from the outer legs 31 and 32 through the armature 27 to middle leg 33 of the core 25 on the next cycle. Thus, when the gyroscope 2 rotates about axis 18 in a clockwise direction to cause the armature 27 to move upward, as viewed in Fig. 1, the armature is moved away from end 36 of the lower leg 32 and less flux is produced in the leg 32 than is produced in the upper leg 31. Conversely, when the gyroscope 2 is rotated counterclockwise, the armature 27 is moved away from the end 34 of the upper leg 31 of the core 25 and spans the ends 35 and 36 of the legs 33 and 32 to produce a greater flux in leg 32 than in leg 31. Thus, the relative value of flux produced in the legs 31 and 32 is dependent upon the relative position of the armature 27 with respect to the ends 34 and 36 of the legs 31 and 32 of the core member 25 whose position, in turn, is dependent upon the rotational position of the gyroscope 2 about the axis 18 with respect to the sighting yoke 11.

The screws 23 and 24 are adjusted with respect to the stop 20 to center the armature 27 with respect to the legs 31 and 32 of the core member 25 when the stop 20 is mid-way between the screws 23 and 24. In this position, the flux produced in each of the legs 31 and 32 by the operating coil 30 are of equal value.

The coils 28 and 29 are positioned respectively on the legs 31 and 32 of the core member 2 and electrically connected in series opposition by a conductor 40 to develop opposing voltages in response to the flux produced in the legs 31 and 32 of the core member 25. The free ends 41 and 42 of the coils 24 and 25 are electrically connected to the precession amplifier 7 through a pair of conductors 43 to supply an alternating current thereto of value and direction dependent upon the relative value of flux produced in the legs 31 and 32 of the core member 25. For example, when the armature 27 is centrally positioned with respect to the ends 34 and 36 of the legs 31 and 32, the flux in legs 31 and 32 are of equal value, and, since the coils 28 and 29 are electrically connected in voltage opposition, the voltage produced in coil 28 is opposed by an equal voltage produced in coil 29 and no current is supplied to the precession amplifier 7. However, when the armature 27 is moved clockwise away from leg 32, the flux developed in leg 31 is greater than the flux developed in leg 32. Thus, coil 28 determines the direction of current at a particular instant and the relative voltages developed in the two coils 28 and 29 determines the value of current supplied to the precession amplifier 7. If, at the particular instant the armature 27 is in a downward position caused by a counterclockwise rotation of the gyroscope 2 about the axis 18, the greater flux produced in leg 32 produces a predominating voltage in coil 29. Coil 29 then determines the direction of current at the particular instant and the relation of voltages in the coils 28 and 29 determines the value of current supplied by the pick-off device 5 to the precession amplifier 7.

The pick-off device 5, therefore, serves as a means for supplying a current to the precession amplifier 7 of direction at a particular instant i. e., phase, and of value dependent upon the degree and direction of rotation of the gyroscope 2 with respect to the sighting yoke 11 about the axis 18.

The precession amplifier 7 comprises a preamplifier stage 44, a discriminator stage 45, a stabilizing network stage 46, and a cathode follower stage 47 in a loop electric circuit with the torque motor 6 and the pick-off device 5, as shown in Fig. 1.

The stages 44—47 of the precession amplifier 7 are electrically connected to the common source of alternating current indicated by the conductors 39 through respective pairs of conductors 48—51.

The output conductors 43 of the pick-off device 5 are electrically connected to the preamplifier stage 44 of the precession amplifier 7 to supply thereto the alternating current produced in the output coils 28 and 29 of the pick-off device 5. The preamplifier 44 is electrically connected through a pair of conductors 52 to the discriminator stage 45 to supply thereto an amplified alternating current proportional to the current received by the preamplifier stage 44 from the pick-off device 5.

The discriminator 45 is electrically connected in conventional manner to the stabilizing network 46 through a pair of conductors 53 to supply thereto a direct current signal depending in value upon the value of the alternating current received from the pick-off device 5 through the preamplifier 44 and in direction upon the phase displacement thereof with respect to alternating current received from the alternating current source indicated by the conductors 39 through the conductors 49.

Phase displacement of current received by the discriminator 45 from the pick-off device 5 with respect to current received by the discriminator from the source 39 is controlled by operation of the pick-off device 5 in response to the direction of rotation of the gyroscope 2 about the axis 18 with respect to the sighting yoke 11. That is, at any particular instant the direction of current in the output conductors 43 of the pick-off device 5 is dependent upon the position of the armature 27 with respect to the legs 31 and 32 of the pick-off device 5.

Those skilled in the art will understand that a discriminator stage, as for example stage 45, is capable of producing a direct current output of direction and value dependent upon the value and phase displacement of the alternating current supplied thereto. Thus, a direct current is produced by the discriminator 45 in its output conductors 53 dependent in value and direction respectively upon the value and direction of current produced by the pick-off device 5.

The stabilizing network 46 is of conventional design except that constants of the network are arranged to produce in the gyroscopic system predetermined characteristics necessary to control hunting or oscillation of the system and to impart good dynamic response in following rapidly changing inputs. Details of the characteristics required for this purpose and the theory by which the required characteristics are determined will be discussed in detail later.

The cathode follower stage 47 is electrically connected to the stabilizing network 46 through a pair of conductors 54 and to the torque motor 6 through a pair of conductors 55 and 56 to amplify the direct current signal produced by the stabilizing network stage 46 sufficiently to operate the torque motor 6.

To measure the value of direct current supplied to the torque motor 6 and the direction thereof and thereby indicate the direction and angular velocity of the gyroscope 2 about the axis 19, any suitable device such as an ammeter may be used. However, since the gyroscopic system shown in Fig. 1 may be used to measure the speed of an object, such as an airplane, at a known range from the gyroscope 2, I have chosen to use an adjustable resistor 57 having opposite ends 58 and 59 and an adjustable tap 60. The resistor 57 is electrically connected between conductor 56 and the cathode follower stage 47 by electrically connecting the tap 60 to the cathode follower stage 47 and the resistor end 59 to the conductor 56. Thus, voltage across the opposite ends 58 and 59 of the resistor 57 is dependent in value and polarity upon the value and direction of the direct current supplied from the cathode follower stage 47 to the torque motor 6 and upon the setting of the adjustable tap 60. Tap 60, therefore, provides a means for adjusting the range resistor 57 for a particular known range of target. A conventional filter circuit 61 may be electrically connected to the ends 58 and 59 of the resistor 57, if desired, to smooth the direct current voltage for use in a computer or other device (not shown) to be energized from the range resistor 57.

The value and polarity of the voltage across the resistor 57 is, therefore, a measure of the angular velocity and direction of tracking of the gyroscope 2. The application of the range resistor merely introduces by its adjustable tap a constant to correct for a known range and thus provide a voltage signal indicating target speed, this being a practical application of the gyroscopic system.

The torque motor 6, shown diagrammatically in Fig. 1 and in cross-sectional view in Fig. 2, comprises a torque arm 62 having opposite ends 63 and 64, a cylindrically shaped operating coil 65, a frusto-conically shaped permanent magnet 66, a cylindrically shaped soft iron pole piece 67, a compensating coil 68, a cylindrical housing 69 having a hollow cylindrical interior 70 and an upper end 71 apertured as at 72 to accommodate the coil 65, and a flat metallic support base 73. The base 73 has one end 74 fixed to the sighting yoke 11 to provide for integral movement of the base 73 with the sighting yoke 11 about the horizontal pivot axis 15.

The housing 69 is made of flux conductive material and is mounted in fixed position on the base 73 as by welding or other suitable means adjacent an end 75 thereof to move in unison therewith. The permanent magnet 66 is centrally positioned in the housing 69 and fixed to a base portion 76 thereof by any suitable means as by cementing and supports the pole piece 67 which is cemented or otherwise fixed thereto. The compensating coil 68 is wound on a base of insulation material 77 positioned on the magnet 66, as shown in Fig. 2, and cemented or otherwise fixed thereto. The base 73, housing 69, magnet 66, pole piece 67 and compensating coil 68, thus are moved integrally with the sighting yoke 11.

The operating coil 65 is wound on a cylindrical base of insulation material 78, positioned on a projecting portion 79 of the torque arm 62, as shown in Fig. 2, and fixed thereto by any suitable means as by cementing. The end 63 of the torque arm 62 is fixed as by welding or other suitable means to an end 83 of the gyroscope 2 opposite end 21 thereof. The torque arm 62 and operating coil 65, thus are moved in unison by the gyroscope 2 as it is oscillated about the axis 18.

The flux produced by the permanent magnet 66 is dispersed radially from the pole piece 67 to the top portion 71 of the housing 69 through which it returns to the permanent magnet 66. A useful radial flux field is thus formed. The coil 65, being cemented to the torque arm 62, is moved by rotation of the gyroscope 2 with respect to the sighting yoke 11 through the useful radial flux field to produce a force on the torque arm 62 opposing rotation of the gyroscope 2 about the axis 18 and depending in value on the current flowing in coil 65.

Since current in the moving coil 65 exerts a small magnetizing or demagnetizing effect on the permanent magnet 66 depending upon the direction of current therethrough, the flux compensating coil 68 is connected in series opposition with the moving coil 65 by a flexible conductor 80 or other suitable means. The free ends numbered 81 and 82 of the coils 65 and 68 are electrically connected to the conductors 55 and 56 to supply current from the pick-off device 5 through the precession amplifier 7 to the coils 65 and 68 of the torque motor 6. By constructing the torque motor 6 as above described and connecting the coils 65 and 68 in series opposition the torque applied by the torque motor 6 through the medium of the torque arm 62 to the gyroscope 2 is made an accurately linear function of current supplied to the torque motor over a sufficiently wide range of motion of the coil to cover the limited oscillation of the gyroscope 2 about the axis 18.

To show details of the characteristics required in the stabilizing network 46 to prevent hunting of the torque motor 6 and to show the theory by which the required characteristics are determined, attention is referred to Figs. 1, 3, 4 and 5.

As shown in Fig. 1 and previously described in detail, the pick-off device 5, precession amplifier 7 and torque motor 6 form a loop circuit with a source of electric energy indicated by the pair of conductors 39 which loop circuit may be self oscillatory unless provision is made to prevent this effect. That is, the output electric signal may oscillate continuously about the correct value, or the oscillations may die out so slowly as to impair the usefulness of the system. It is also necessary that the current supplied to the torque motor 6 by the precession amplifier 7 accurately represent the tracking rate, that is, the rate and direction of angular velocity of the gyroscope 2 about the axis 19, under all conditions which may arise in use. Thus, the overall frequency response must be satisfactory in that it have no peaks likely to cause trouble in a computer or other device actuated from the gyroscopic system 1. The requirements above outlined necessitate providing specific characteristics in the precession amplifier 7 by adjusting constants in the stabilizing network stage 46 thereof accordingly.

The characteristics required for the loop circuit could be determined by exhaustive mathematical computations. However, since plots of attenuation versus frequency are in common use for analysis of servo systems, it is preferable to represent the gyroscopic system above described by an equivalent simple servo, the input to which is the angular tracking rate represented in Fig. 3 by arrow 84, the output of which is proportional to the precession current supplied to the torque motor 6 and represented by arrow 85, and the open loop transfer function of which, denoted by SW, is chosen to make the servo response identical with that of the actual gyroscope system. The transfer function of an element is here defined as the ratio of its output to its input signal, expressed in operational form.

It is found, by setting up the torque equations for the gyroscopic system, that it will have a dynamic response identical with that of the equivalent servo system if $$C\frac{KG}{P^2}=SW$$

where

KG is the transfer function of the precession amplifier,
C is a composite constant depending on the torque motor, gyroscope, and pick-off design, and
P is the derivative operator $$\frac{d}{dt}$$

It is known that the system will be stable in operation if the attenuation-versus frequency plot of SW is as shown in Fig. 4 provided the length of the portion having a slope of —20 decibels per decade is appreciably longer than that having a slope of —60. The plot shown in Fig. 4 is indicative of the behaviour of the system for a sinusoidally varying input, and shows the transfer function, or ratio of output to input plotted vertically in decibels, against the logarithm of the input frequency plotted horizontally.

It now remains to choose a suitable characteristic for KG, such that the attenuation plot of $$C\frac{KG}{P^2}$$

will have the same form as SW in Fig. 4. Those familiar with servo analysis will recognize that the term C will merely raise or lower the plot uniformly, while the term $1/P^2$ will contribute an additional slope of —40 decibels per decade. Therefore, KG must have the form shown in Fig. 5 because it will be seen that if the plot shown in Fig. 5 is given an additional slope of —40 decibels per decade and moved vertically through the necessary amount the plot becomes the same as that of Fig. 4.

Networks formed of resistors and capacitors in series with an amplifier of constant gain may be arranged to give the attenuation characteristic shown in Fig. 5. Such a network comprises stabilizing network 46 in Fig. 1. The constant gain is contributed by the amplifier 44 and cathode follower 47. A suitable network, for example, will have points 86, 87, and 88 at frequencies of 1.6, 6.4, and 50 cycles per second respectively, and the gain of the amplifier will be so adjusted that the resultant SW of Fig. 4 will cross the zero decibel axis at a frequency of 24 cycles per second.

It is possible to assume forms of SW other than that shown in Fig. 4, which appear to correspond to systems having satisfactory stability and dynamic performance. However, when the corresponding necessary form of KG is found for each, it is discovered that all are inferior to that shown in one respect or another. Some correspond to networks which require excessive amplifier gains or voltages, or which are not physically attainable for other reasons. Some, although physically attainable, permit the gyroscope to have excessive amplitudes of mechanical motion at certain frequencies, so that in general the form shown is preferred.

In operation, the gyroscope 2 is manually pivoted about the axis 10 and about the axis 15 by means of the training yoke 8 and the sighting yoke 11, as previously described to align the spin axis 3 thereof with a target being tracked. In this manner, the gyroscope 2 is rotated about the axis 19 which is perpendicular to the axis 18 and the gyroscope spin axis 3. However, since the gyroscope 2 can be rotated about the axis 19 only when supplied with a torque about the axis 18, such torque must be provided by the torque motor 6 through the medium of the torque arm 62.

When an attempt is made to rotate the gyroscope 2 about the axis 19, the gyroscope begins to rotate about the axis 18 in direction depending upon the direction of rotation of the gyroscope about the axis 19. In doing so, the armature 27 of the pick-off device 5 is moved off center from its established zero position to cause the pick-off device 5 to supply a current of value and direction dependent upon the angular rate and direction of the gyroscope 2 about the axis 19.

As previously described, the current supplied to the precession amplifier 7 by the pick-off device 5 is amplified, discriminated with respect to the current supplied to the precession amplifier from the source of alternating current indicated by the pair of conductors 39 and common to the pick-off device 5 and the precession amplifier and supplied to the torque motor as a direct current of value substantially proportional to the value of the current supplied by the pick-off device to the precession amplifier, and at polarity dependent on its phase displacement.

Moreover, the value of current supplied to the torque motor is proportional to the angular rate of movement of the gyroscope 2 about the axis 19. That is, as the gyroscope 2 rotates about the axis 18 in response to rotation thereof about the axis 19, the current supplied by the pick-off device 5 to the precession amplifier 7 increases to increase the direct current to the torque motor until sufficient current is being supplied to the torque motor to produce a torque on the gyroscope 2 equal and opposite to the torque developed thereon in response to rotation of the gyroscope 2 about the axis 19. When equilibrium is established between the opposing torques, the gyroscope ceases to rotate about the axis 18 and remains stationary until a change in the angular rate of the gyroscope about the axis 19 is made. The torque motor 6 being provided with linear response characteristics, the value of current supplied thereto to develop an opposing balancing torque on the gyroscope 2 is proportional to the angular rate of movement of gyroscope 2 about the axis 19.

To indicate the value of current supplied to the torque motor 6 and thereby the angular rate of movement of the gyroscope 2 about the axis 19, an ammeter (not shown) may be connected in series circuit in either of the conductors 55 or 56, or a voltmeter (not shown) may be connected across the range resistor 57. The range resistor 57 and filter circuit 61 have been shown merely to illustrate how my gyroscopic system 1 may be connected to a computer device to indicate, by setting the range resistor for a predetermined range, the speed of the object being tracked.

Therefore, in accordance with my invention, I have provided a simple, reliable gyroscopic system wherein the accuracy thereof does not depend on the linearity of the pick-off device or of the amplifier, on the zeroing of the pick-off device, or on the magnitude of voltage supplied to the pick-off device or amplifier.

While I have shown and described a particular embodiment of my invention, it will be obvious to those skilled in the art that various changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States is:

1. A gyroscopic system for measuring one component of angular rate of a tracking line comprising a gyroscope having a spin axis, means pivotally supporting said gyroscope for oscillation about a first axis perpendicular to said spin axis and for rotation about a second axis perpendicular to said spin axis and said first axis, a stop means mechanically connected to said gyroscope and said support means for limiting the degree of oscillation of said gyroscope about said first axis, a torque motor mechanically connected to said support means and said gyroscope to control the oscillation of said gyroscope about said first axis in response to an electric current supplied to said torque motor, an electric pick-off device mechanically connected to said gyroscope and said support means, a precession amplifier of predetermined characteristics, connections for electrically connecting said pick-off device and said precession amplifier to a common source of alternating current to receive electric power therefrom, connections for electrically connecting said pick-off device through said precession amplifier in loop circuit to said torque motor to supply thereto a direct current of value and polarity dependent upon the rate and direction of rotation of said gyroscope about said second axis.

2. A gyroscopic tracking device for measuring one component of angular velocity of a tracking line comprising a gyroscope having a spin axis, means pivotally supporting said gyroscope for rotation about a first axis perpendicular to said spin axis and for rotation about a second axis perpendicular to said spin axis and said first axis, a stop means mechanically connected to said gyroscope and said support means for limiting the rotation of said gyroscope about said first axis, an electric pick-off device, a precession amplifier, an electric torque motor, connections for electrically connecting said pick-off device and said precession amplifier to a common source of alternating current, connections for electrically connecting said pick-off device in loop circuit through said precession amplifier to said torque motor, separate means for mechanically connecting said pick-off device and said torque motor to said gyroscope and said support means, means electrically connecting said pickoff device to supply current to said torque motor through said precession amplifier, said torque motor current being proportional to the angular velocity and direction of rotation of said gyroscope about said second pivot axis thereby to apply a torque to said gyroscope of predetermined value necessary to oppose rotation thereof about said second pivot axis, said precession amplifier being provided with predetermined characteristics to prevent hunting of said torque motor in its operation on said gyroscope.

3. A gyroscopic tracking device for measuring one component of angular velocity of a tracking line comprising a gyroscope having a spin axis, means pivotally supporting said gyroscope for rotation about a first axis perpendicular to said spin axis and for rotation about a second axis perpendicular to said spin axis and said first axis, a stop means mechanically connected to said gyroscope and said support means for limiting the rotation of said gyroscope about said first axis, an electric pick-off device, a precession amplifier, an electric torque motor, connections for electrically connecting said pick-off device and said precession amplifier to a common source of alternating current, connections for electrically connecting said pickoff device in loop circuit through said precession amplifier to said torque motor, means mechanically connecting said pick-off device to said gyroscope and said support means, said pickoff device supplying to said precession amplifier an alternating current proportional in phase and magnitude to the direction of movement and angular velocity of said gyroscope about said second axis, and means mechanically connecting said torque motor to said gyroscope and said support means to cause said torque motor to operate in response to current received from said precession amplifier to apply a torque to said gyroscope in opposition to rotation thereof about said first axis, said precession amplifier being provided with predetermined characteristics to prevent hunting of said torque motor in its operation on said gyroscope.

4. A gyroscopic tracking device for measuring one component of angular velocity of a tracking line comprising a gyroscope having a spin axis, means pivotally supporting said gyroscope for rotation about a first pivot axis perpendicular to said spin axis and for rotation about a second pivot axis perpendicular to said spin axis and said first pivot axis, a stop means connected to said gyroscope and said support means for limiting the rotation of said gyroscope about said second pivot axis, an electric pick-off device, a precession amplifier, and an electric torque motor, said precession amplifier comprising a preamplifier stage, a discrimination stage, a stabilizing network stage, and a cathode follower stage, connections for electrically connecting said pick-off device and said precession amplifier to a common source of alternating current, connections for electrically connecting said pickoff device in loop circuit through said precession amplifier to said torque motor, means mechanically connecting said pick-off device to said gyroscope and said support means, said pickoff device supplying to said precession amplifier an alternating current proportional in phase and magnitude to the direction of movement and angular velocity of said gyroscope about said second pivot axis, means mechanically connecting said torque motor to said gyroscope and said support means to cause said torque motor to operate in response to current received from said precession amplifier to apply a torque to said gyroscope in opposition to rotation thereof about said second pivot axis, said stabilizing network stage of said precession amplifier being provided with predetermined characteristics to prevent hunting of said torque motor in its operation on said gyroscope.

5. In an apparatus for determining the angular velocity of a distant rapidly moving target, a gyro having a spin axis, a base member, pivotal supporting means intermediate said gyro and base member for enabling rotation of said gyro about a first axis perpendicular to said spin axis and precession of said gyro about a second axis perpendicular to said first axis, a frequently compensated electrical spring associated with said gyro and said supporting means for restraining the precession of said gyro with a force dependent upon the degree of precession thereof, said electrical spring including an electrical pick-off device mounted upon said supporting means and gyro and having an output responsive to gyro precession, an amplifier connected to said pick-off device for intensifying the output thereof, a torque motor means mounted upon said supporting means and gyro for applying a variable torque to the gyro in a direction to restrain precession thereof, and a reactive network connectable intermediate said amplifier and motor and having a transfer function operable to nullify transient instabilities of the apparatus effected by target tracking rates approaching the natural resonant frequencies of the gyro and associated electrical spring.

6. Apparatus for measuring the angular velocity of a distant rapidly moving target comprising a gyro having a spin axis, a first supporting means for said gyro enabling its rotation about a tracking axis normally perpendicular to said spin axis when the target is being followed by said gyro, a second pivotally supporting means for said gyro to enable its precession about an axis perpendicular to said tracking axis in response to rotation thereof about said tracking axis, and a frequency compensated electrical spring for restraining the precession of said gyro with a force dependent upon the rate of rotation about said tracking axis, said electrical spring including an electrical pick-off having an output proportionally responsive to gyro precession, an amplifier for intensifying the pick-off output, a torque motor means for applying a variable torque to the gyro in a direction to restrain precession thereof, and a reactive network electrically intermediate said amplifier and motor and having a transfer function operable to nullify transient instabilities of the apparatus effected by target tracking rates approaching the natural resonant frequencies of the gyro and associated electrical spring.

7. In a frequency compensated electrically restrained gyro for determining the rate of rotation of a body about a given axis, a gyro rotor supported for rotation about said given axis and for precession about a second axis perpendicular thereto, electrical pick-off means responsive to precession of said gyro rotor about said second axis for generating an electrical signal proportional thereto, an actuator for applying a variable torque to the gyro rotor in opposition to precessional rotation thereof, and an electrical signal amplifying and modifying means responsive to said pick-off signal for energizing said actuator, said signal-modifying means having a frequency response that decreases the degree of amplification at a rate of minus 20 decibels over a given range of frequencies and increases the degree of amplification at the rate of plus 20 decibels over a succeeding second range of frequencies occurring prior to the natural resonant frequency of the combined gyro rotor, pick-off, and actuator, whereby the output of said signal modifying means is proportional to the rate of gyro rotation about said given axis independently of the non-linearity or null position of the pick-off and independently of the non-linearity of the signal-modifying means, and said gyro rotor is additionally compensated against oscillatory instabilities.

References Cited in the file of this patent

UNITED STATES PATENTS

| | | |
|---|---|---|
| 2,274,443 | Fischer | Feb. 24, 1942 |
| 2,414,108 | Knowles et al. | Jan. 14, 1947 |
| 2,417,689 | Johnson | Mar. 18, 1947 |
| 2,504,170 | Wong | Apr. 18, 1950 |
| 2,553,786 | Redemske | May 22, 1951 |
| 2,586,817 | Harris | Feb. 26, 1952 |
| 2,592,417 | Hale | Apr. 8, 1952 |